Figure 1:
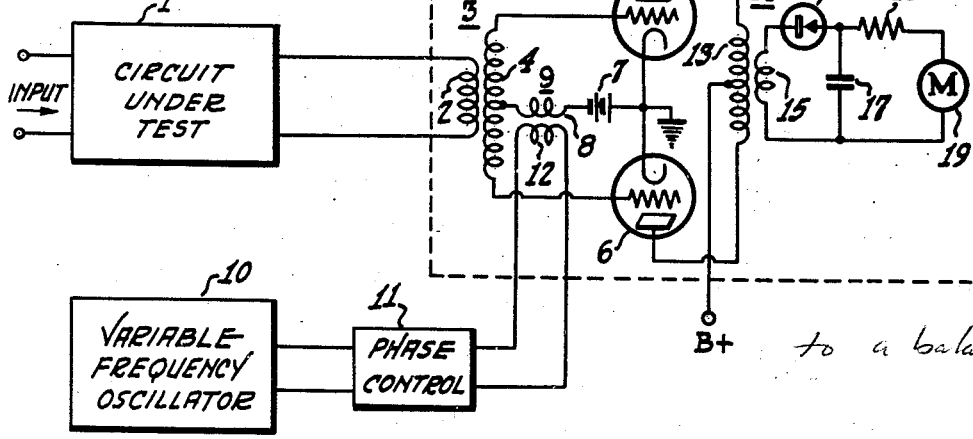

Dec. 9, 1947.   C. G. SONTHEIMER   2,432,214
ELECTRICAL WAVE ANALYZER
Filed Sept. 25, 1943

Inventor
CARL G. SONTHEIMER
By
Attorney

Patented Dec. 9, 1947

2,432,214

UNITED STATES PATENT OFFICE 2,432,214

ELECTRICAL WAVE ANALYZER

Carl G. Sontheimer, Haddonfield, N. J., assignor to Radio Corporation of America, a corporation of Delaware Application September 25, 1943, Serial No. 503,841

6 Claims. (Cl. 175—183)

This invention relates generally to wave analyzers and more particularly to apparatus for analyzing the relative magnitudes and frequencies of signal voltages derived from electrical circuits.

Heretofore, current analyzers for measuring the relative magnitudes and the frequencies of currents derived from an electrical circuit have comprised relatively complex filter networks for selecting predetermined frequency components of the signals under observation, and measuring equipment for determining the relative magnitudes of the selected frequency components. Measurements with apparatus of this type necessarily involve numerous apparatus adjustments to determine the relative frequency-amplitude characteristics of the signals being observed. Also, the particular characteristics of the filter networks throughout the frequency band to be observed must be taken into consideration in the final analysis of the signal components.

The instant invention contemplates an improvement upon known systems for analyzing currents in that tuned filter networks are not required since the particular frequency component is selected by means of an adjustable oscillator which is connected to activate a balanced modulator circuit responsive to the signal energy under observation.

In the simplest embodiment of the invention, a circuit under test is connected to a balanced modulator circuit which normally is so biased that no signals will be transmitted thereby. A variable frequency oscillator is connected through an adjustable phasing circuit to a symmetrical point in the balanced modulated circuit whereby no output therefrom is derived from the variable oscillator, but signals from the circuit under test which correspond in frequency to the oscillator frequency are transmitted by the balanced modulator and applied to an indicating circuit.

A second embodiment of the invention is especially adapted to the measurement of the relative amplitudes of selected harmonics of the output of an amplifier, to the input of which a sine wave signal is supplied. In this embodiment a test frequency source, having substantially sine wave output, is connected to the input of an amplifier of which the harmonic distortion is to be measured. The output circuit of the amplifier is connected to the input circuit of a balanced modulator which is normally biased so that no signal output is derived therefrom. The test frequency source is connected through a distortion circuit to synchronize an adjustable locking oscillator circuit which may be locked at the fundamental or at successive harmonics of the test frequency. The output circuit of the adjustable locking oscillator is connected through an adjustable phasing circuit to a symmetrical point in the balanced modulator. No output is derived from the balanced modulator in response to the signals applied thereto from the adjustable locking oscillator. However, signals applied to the modulator from the adjustable locking oscillator permit the transmission therethrough of signals of the same frequency derived from the amplifier under test. The signals thus transmitted by the balanced modulator are applied to a suitable measuring circuit for indicating the relative amplitudes of the harmonics selected by the locking oscillator.

Among the objects of the invention are to provide an improved method of and means for analyzing the relative amplitudes and frequencies of signals derived from an electrical circuit. Another object of the invention is to provide an improved method of and means for analyzing the relative harmonic distortion in an electrical circuit under test. An additional object of the invention is to provide an improved method of and means for measuring the relative amplitudes and frequencies of signal voltages derived from an electrical circuit wherein particular frequencies to be observed are derived from a local oscillator and applied to a balanced modulator circuit to activate said modulator to pass said selected frequency from the circuit under observation to an indicating device.

An additional object of the invention is to provide an improved means for analyzing the relative amplitudes and frequencies of signals derived from an electrical circuit which comprises a second signal source of adjustable frequency and phase for activating a normally biased-off balanced modulator circuit to measure the amplitudes of selected frequencies from the circuit under test.

Figure 2:
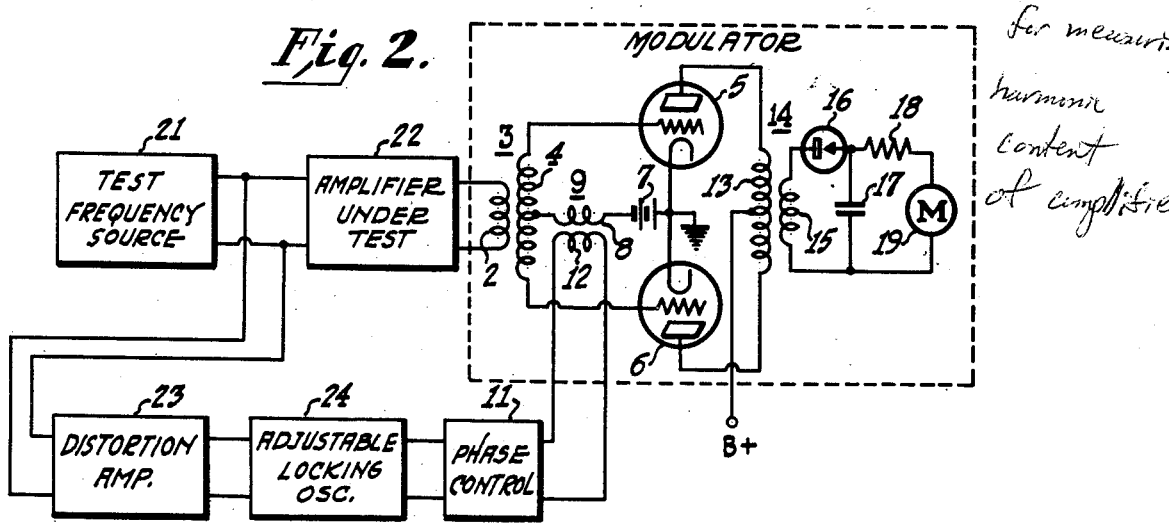

The invention will be further described by reference to the accompanying drawing of which Figure 1 is a schematic circuit diagram of one embodiment thereof; and Figure 2 is a schematic circuit diagram of a second embodiment of the invention. Similar reference characters are applied to similar elements throughout the drawing.

Referring to Figure 1, an electrical circuit 1 of which the relative amplitudes and frequencies of signals derived therefrom is to be measured, is connected to a primary winding 2 of a first transformer 3. The transformer 3 includes a center tapped secondary winding 4, the end terminals of which are connected respectively to the control electrodes of two balanced modulator thermionic tubes 5, 6. The cathodes of the two modulator tubes 5, 6 are connected together and grounded.

A source of control electrode bias such as, for example, a battery 7 is connected between the cathodes of the balanced modulator tubes 5, 6 and one terminal of the secondary winding 8 of a second transformer 9. The remaining terminal of the secondary winding 8 of the second transformer 9 is connected to the center tap of the secondary winding 4 of the first transformer 3.

A variable frequency oscillator 10, having a frequency range equal to the frequency range to be observed from the circuit under test, is connected through an adjustable phase control circuit 11 to the primary winding 12 of the second transformer 9. The anodes of the balanced modulator tubes 5, 6 are connected to the end terminals of a center tapped primary winding 13 of an output transformer 14. A source of positive anode potential is connected to the center tap of the primary winding 13 of the output transformer 14. A secondary winding 15 of the output transformer 14 is connected, for example, through a rectifier 16 and an integrating circuit comprising a capacitor 17 and a resistor 18 to an indicating meter 19.

In operation, the variable frequency oscillator, which should be frequency-calibrated, is adjusted over the frequency band to be observed. The phase control 11 is adjusted to provide maximum output on the indicating meter 19. Only those frequencies corresponding substantially to the particular frequency derived from the variable frequency oscillator will be transmitted by the modulator circuit from the circuit under test to the measuring circuit which includes the indicating meter 19. The reading on the indicating meter 19 will be characteristic of the relative amplitude of each particular frequency component selected by the variable frequency oscillator.

Figure 2 is a circuit especially adapted to the measurement of harmonic distortion produced within the circuit or device under test. The device to be tested is excited by a test frequency source having substantially sine wave output. The test frequency source 21, having a sine wave output at a predetermined fixed frequency, is connected to the input of an amplifier or other circuit 22 which is to be tested. The output circuit of the amplifier 22 is connected to the primary winding 2 of a first transformer 3 in the same manner as described in Figure 1. The output circuit of the test frequency source is also connected to the input of a distortion circuit such as, for example, a distortion amplifier 23 which provides strong harmonic frequency output. The output of the distortion amplifier 23 is applied to an adjustable locking oscillator 24 which may be "locked in" at the fundamental or any desired harmonic of the output frequency derived from the test frequency source 21. It is well known that thermionic tube oscillators may be "locked" to an input frequency source, or to a harmonic frequency thereof, by closely coupling the source to the oscillatory circuit, and by tuning the oscillatory circuit to approximate resonance therewith. The output currents of the adjustable locking oscillator 24 are applied, through an adjustable phase control network 11, to the primary winding 12 of a second transformer 9. The design characteristics of distortion amplifiers as harmonic generators, synchronization of locking oscillators and phase controls are described, for example, in Radio Engineers' Handbook, by F. E. Terman (1943), at pages 458 et seq., 510 et seq., and 949 et seq., and in the extensive bibliography referred to therein. The characteristics of these devices for the purposes set forth may be selected in accordance with known technique. The transformers 3 and 9 are connected in a balanced modulator circuit comprising the thermionic tubes 5, 6 in the same manner as described heretofore in the circuit of Figure 1. Similarly, the output of the balanced modulator is connected to an indicating meter 19 in the same manner as described heretofore.

In operation, the test frequency source is adjusted to the desired test frequency, and the adjustable locking oscillator is first adjusted to be locked in at the fundamental frequency of the test frequency source. The phase control 11 is adjusted until a maximum indication is derived on the meter 19. The adjustable locking oscillator is successively adjusted to be locked in at successive harmonics of the test frequency. After each adjustment of the locking oscillator the phase control 11 is adjusted to provide a maximum indication on the output meter 19. The successive readings provided by the output meter 19 are characteristic of the relative magnitudes of the fundamental and harmonic frequencies transmitted by the amplifier under test in response to the substantially sine wave input test frequency.

The phase control circuit 11 should be adjustable over a 90° phase range. The adjustable oscillator employed in both modifications of the invention should be substantially free of harmonic distortion since any such distortion will provide spurious indications upon the output meter 19. It should be understood that any type of balanced modulator circuit known in the art, which will transmit signals from the circuit under test only in response to signals of like frequency derived from the adjustable oscillator, may be employed to provide the desired output indications. This condition obtains when the negative bias provided by the grid bias battery for the modulator tubes preferably exceeds the tube anode current cut-off grid bias by an amount substantially equal to the voltage magnitude of the signals to be measured. Thus the modulator tubes conduct only when the oscillator output reduces the grid bias to a value such that the applied signals will be rectified. Due to the conventional input and output balanced signal circuits, the oscillator signals are balanced out in the modulator output circuit, while the selected signal to be analyzed is applied to the measuring network. It also should be understood that various other modifications of the invention apparent to one skilled in the art may be employed to test particular apparatus different from that described herein for purpose of illustration.

I claim as my invention:

1. Apparatus for measuring the harmonic distortion of an amplifier including a reference frequency voltage source having a substantially sine wave output voltage, means for applying said voltage to actuate said amplifier, a distortion circuit, means for applying said voltage to actuate said circuit to provide high harmonic output components therefrom, a locking oscillator, means connecting said circuit to said oscillator to provide oscillations at a predetermined one of said frequencies derived from said circuit, a balanced modulator, means connecting said amplifier to actuate said modulator, means connecting said oscillator to said modulator to activate said modulator to pass substantially only signals derived from said amplifier which correspond in frequency to said predetermined oscillator frequency, and means responsive to said passed modulator signals for indicating the magnitude of said predetermined one of the harmonic frequency components of the signals derived from said amplifier.

2. Apparatus of the type described in claim 1 including means for adjusting the frequency of said oscillator to different predetermined harmonic frequencies of said reference frequency for indicating the relative harmonic frequency magnitudes of signals derived from said amplifier.

3. Apparatus of the type described in claim 1 including means for adjusting the relative phases of said signals derived from said amplifier and said oscillator.

4. Apparatus for measuring the harmonic distortion of an amplifier including a reference frequency voltage source having a substantially sine wave output voltage, means for applying said voltage to actuate said amplifier, a distortion circuit, means for applying said voltage to actuate said circuit to provide high harmonic output components therefrom, a locking oscillator, means connecting said circuit to said oscillator to provide oscillations at a predetermined one of said frequencies derived from said circuit, a balanced modulator comprising a pair of thermionic tubes connected in a balanced circuit and normally biased to anode current cut-off condition, push-pull means connecting said amplifier to actuate said modulator, means connecting said oscillator to said modulator to activate said modulator to pass substantially only signals derived from said amplifier which correspond in frequency to said predetermined oscillator frequency, and means responsive to said passed modulator signals for indicating the magnitude of said predetermined one of the harmonic frequency components of the signals derived from said amplifier.

5. Apparatus for analyzing the relative component amplitudes and frequencies of complex multifrequency signals derived from an electrical circuit comprising a source of signals connected to said circuit, a source of oscillations adjustable in frequency and phase to the frequency and phase of a selected frequency component of said derived complex signals, a balanced modulator, biasing voltage means for said modulator normally blocking transmission of said complex signals through said modulator, means connecting said source of oscillations to said modulator to unblock said modulator to pass only said selected component of said derived complex signals which corresponds in frequency and phase to said adjusted oscillations, and means for deriving from said modulator output signals of magnitude which is proportional to the magnitude of said selected component of said complex signals derived from said electrical circuit.

6. Apparatus according to claim 5 including an indicator responsive to said derived output signals.

CARL G. SONTHEIMER.

REFERENCES CITED

The following references are of record in the file of this patent:

UNITED STATES PATENTS

| Number | Name | Date |
|---|---|---|
| 1,695,047 | Horton | Dec. 11, 1928 |
| 1,762,160 | Curtis | June 10, 1930 |
| 1,684,403 | Mason | Sept. 18, 1928 |
| 1,527,228 | Schelleng | Feb. 24, 1925 |
| 1,596,942 | Nyquist et al. | Aug. 24, 1926 |
| 1,854,432 | Thurston | Apr. 19, 1932 |
| 1,645,618 | Nyquist | Oct. 18, 1927 |
| 1,755,244 | Kietze | Apr. 22, 1930 |
| 2,093,512 | Bowen | Sept. 21, 1937 |